(12) United States Patent
Naor et al.

(10) Patent No.: US 10,364,904 B2
(45) Date of Patent: Jul. 30, 2019

(54) CONTROL VALVE

(71) Applicant: Dorot Management Control Valves Ltd., D.N. Hof Ashkelon (IL)

(72) Inventors: Giora Naor, Kibbutz Bror Hail (IL); Vladimir Ryabtsev, Herzliya (IL)

(73) Assignee: DOROT MANAGEMENT CONTROL VALVES LTD., D.N. Hof Ashkelon (IL)

( * ) Notice: Subject to any disclaimer, the term of this patent is extended or adjusted under 35 U.S.C. 154(b) by 0 days.

(21) Appl. No.: 15/407,814

(22) Filed: Jan. 17, 2017

(65) Prior Publication Data
US 2017/0204980 A1 Jul. 20, 2017

(30) Foreign Application Priority Data
Jan. 18, 2016 (IL) .......................................... 243664

(51) Int. Cl.
*F16K 31/126* (2006.01)
*F16K 11/22* (2006.01)
*F16K 27/02* (2006.01)

(52) U.S. Cl.
CPC .......... *F16K 11/22* (2013.01); *F16K 31/1262* (2013.01); *F16K 27/0236* (2013.01); *Y10T 137/87861* (2015.04)

(58) Field of Classification Search
CPC ........................... F16K 27/003; F16K 27/0236
USPC ......................................... 137/878, 881, 883
See application file for complete search history.

(56) References Cited

U.S. PATENT DOCUMENTS

| | | | | |
|---|---|---|---|---|
| 2,965,124 A | * | 12/1960 | Bonnard | ................. F16K 11/20 137/267 |
| 3,822,722 A | * | 7/1974 | Romanelli | ............ F16K 27/003 137/886 |
| 4,221,361 A | | 9/1980 | Weingarten | |
| 5,139,225 A | | 8/1992 | Olson et al. | |
| 5,273,075 A | * | 12/1993 | Skaer | ........................ F16K 7/16 137/883 |

(Continued)

FOREIGN PATENT DOCUMENTS

| | | |
|---|---|---|
| EP | 992725 A2 | 4/2000 |
| JP | 11311342 H | 11/1999 |

OTHER PUBLICATIONS

Bermad, "Dual Horns", Product catalogue: Irrigation 100 Series, p. 6.

*Primary Examiner* — John Fox
(74) *Attorney, Agent, or Firm* — Roberts Mlotkowski Safran Cole & Calderon, P.C.

(57) ABSTRACT

A control valve is provided, comprising a valve body having an inlet port extending along an inlet axis, first and second outlet ports extending along outlet axes substantially parallel to a single reference axis and substantially perpendicular to the inlet axis, first and second sealing ports associated, respectively, with the first and second outlet ports and each disposed in a fluid path between the inlet port and its respective outlet port, and first and second sealing members configured for independently and selectively opening and closing the first and second sealing ports, respectively. Each of the sealing ports extends along a sealing axis extending transverse to a plane being parallel to its respective outlet axis and the inlet axis, and forms, between a downstream end thereof and an upstream end of the inlet axis, an obtuse angle greater than 90°.

16 Claims, 12 Drawing Sheets

(56) References Cited

U.S. PATENT DOCUMENTS

| | | | |
|---|---|---|---|
| 5,335,696 A * | 8/1994 | McKenzie | F16K 7/126 |
| | | | 137/863 |
| 5,549,134 A * | 8/1996 | Browne | F16K 7/16 |
| | | | 137/240 |
| 5,829,473 A | 11/1998 | Hajbi et al. | |
| 6,032,690 A * | 3/2000 | Weissfloch | F16K 7/126 |
| | | | 137/599.08 |
| 6,098,622 A | 8/2000 | Nobile et al. | |
| 6,354,813 B1 | 3/2002 | Laing | |
| 8,141,585 B2 | 3/2012 | Tschurtz | |
| D660,404 S | 5/2012 | Weingarten | |
| 8,695,636 B2 | 4/2014 | Kuhnle et al. | |
| 8,894,036 B2 | 11/2014 | Weingarten | |
| 9,068,664 B2 | 6/2015 | Weingarten | |
| 2006/0118751 A1 | 6/2006 | Lodolo | |
| 2011/0226367 A1* | 9/2011 | Equit | F16K 7/14 |
| | | | 137/863 |

\* cited by examiner

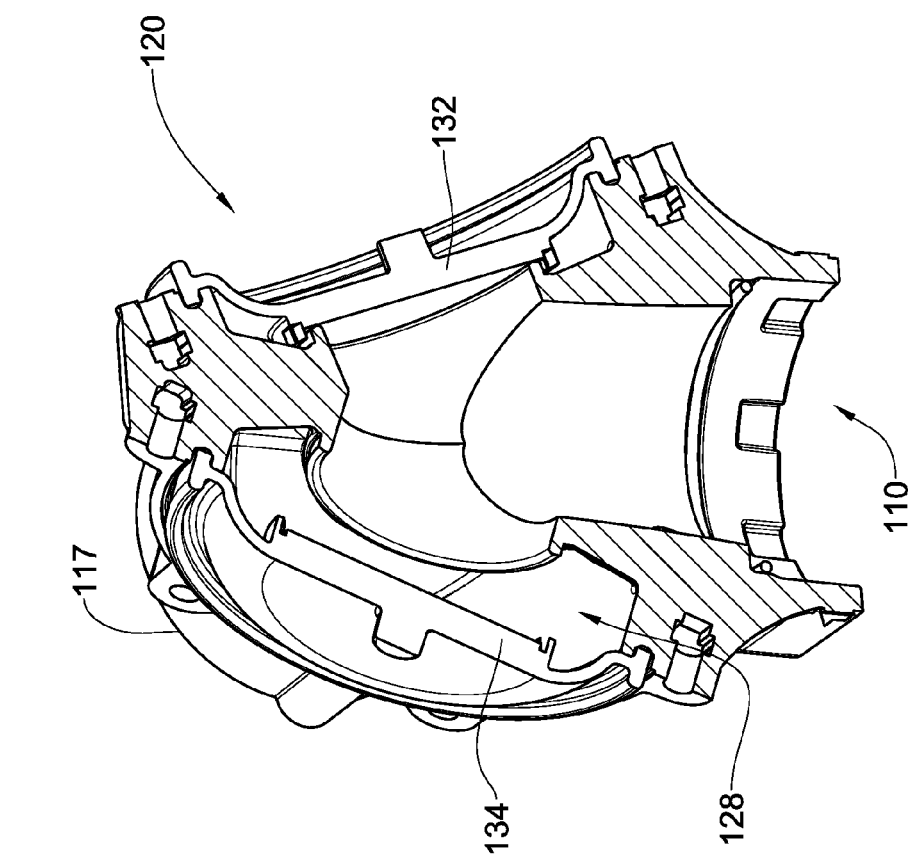
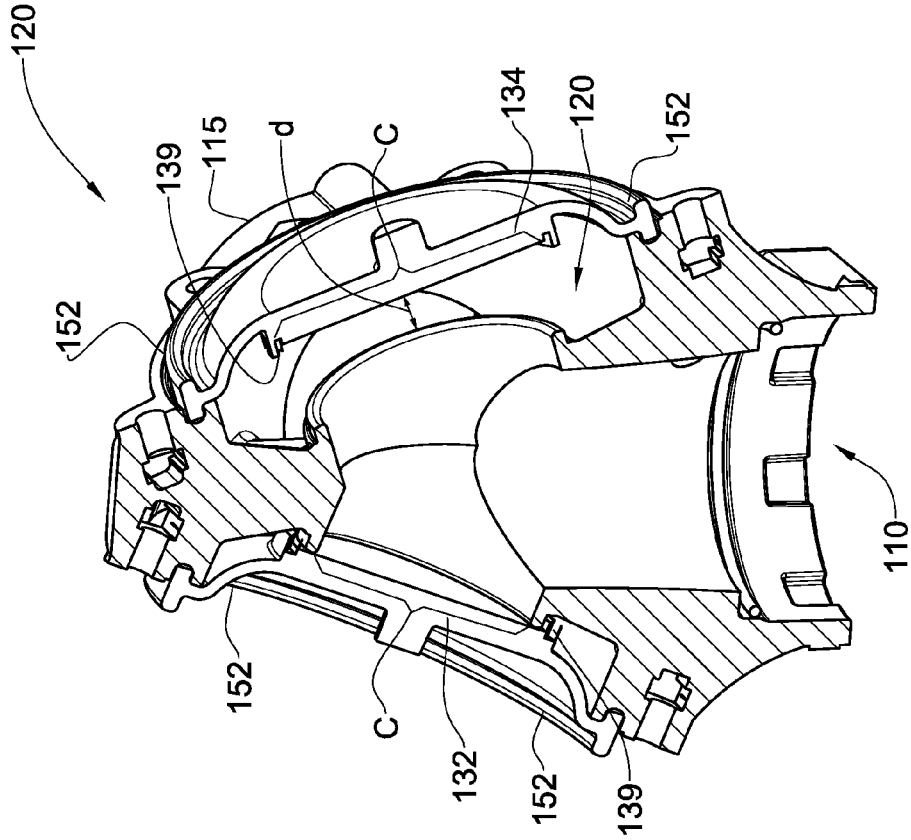
Fig. 5b
Fig. 5a

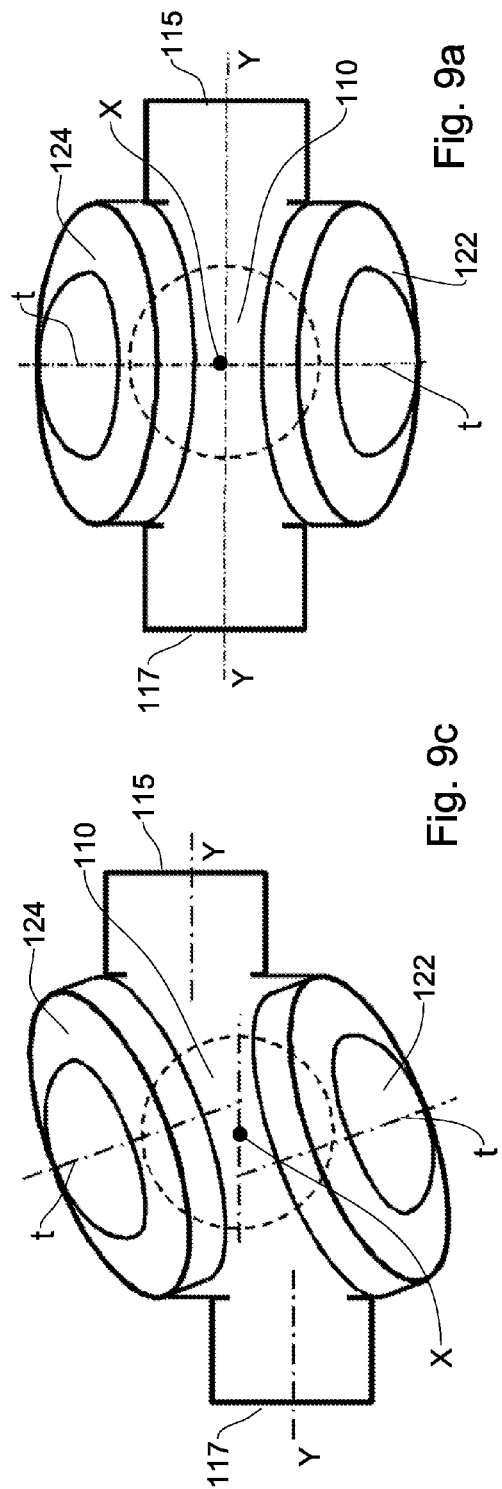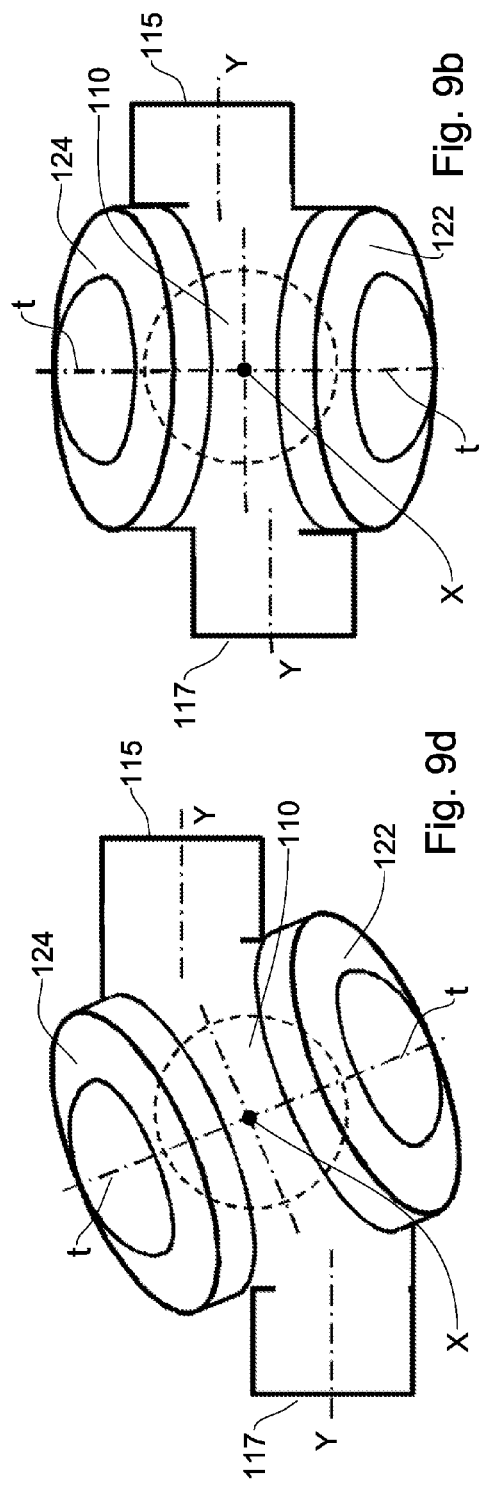

CONTROL VALVE

TECHNOLOGICAL FIELD

The presently disclosed subject matter is in the field of control valves.

BACKGROUND

Various types of control valves are known in the art. The following publications disclose some examples. U.S. Pat. No. 5,139,225 discloses a pneumatically controlled valve system featuring simplified modular construction, reduction of moving parts, improved control of valve operation and increased resistance to corrosive effects of transfer fluid used with the valve. The operation of the valve is pneumatically controlled through specially designed, removably attached gas inlet and outlet ports with orifices of pre-selected lengths and internal diameters designed to affect the introduction rate of the pressurizing gas, which drives the valve stem assembly by the deflection of the upper and lower diaphragms of the valve stem assembly, thus reducing shock to the valve system by rapid valve closure and possible damage to valve components.

U.S. Pat. No. 6,354,813 discloses a three-way-valve actuated by fluid which moves membranes.

Another example is disclosed in U.S. Pat. No. 8,141,585 directed to a rocker type diaphragm valve. The diaphragm in the diaphragm valve is asymmetric and the stroke of the diaphragm is offset from the center of the diaphragm. The two sealing surfaces that the diaphragm acts against form two planes that make an angle with respect to one another. The diaphragm may be fabricated in only one piece. The diaphragm may also be made from a resilient material and shaped in such a way as to create a spring force holding the diaphragm into a default position in the valve.

SUMMARY

According to one aspect of the presently disclosed subject matter, there is provided a control valve comprising:
  a valve body having an inlet port connectable to an upstream fluid supply line and extending along an inlet axis;
  first and second outlet ports extending, respectively, along first and second outlet axes, and each connectable to a downstream fluid line, the first and second outlet axes extending substantially parallel to a single reference axis and substantially perpendicular to the inlet axis;
  a first sealing port associated with the first outlet port and disposed in a fluid path between the inlet port and the first outlet port, and a second sealing port disposed in a fluid path between the inlet port and the second outlet port; and
  first and second sealing members configured for independently and selectively opening and closing the first and second sealing ports, respectively;
wherein each of the sealing ports extends along a sealing axis extending transverse to a plane being parallel to its respective outlet axis and the inlet axis, and forms, between a downstream end thereof and an upstream end of the inlet axis, an obtuse angle greater than 90°.

It will be appreciated that the reference axis is any selected axis. The recitation of the two outlet axes being substantially parallel to a single reference axis is meant to include, inter alia, examples wherein the outlet axes are substantially coaxial with one another, substantially parallel to one another, etc.

Each of the sealing axes may be substantially perpendicular to the plane.

The angle between each sealing axis and the inlet axis is about 110°.

At least one of the first sealing member and the second sealing member may comprise a diaphragm.

At least one of the first sealing member and the second sealing member may comprise a piston actuatable disk.

Each of the sealing members may be configured to move between open and closed positions along its respective sealing axis.

At least one of the first sealing port and the second sealing port may be configured so as be opened to at least one intermediate position between fully opened and closed.

The first and second outlet axes may be co-planar with the inlet axis.

The first and second outlet axes may be coaxially disposed (i.e., coincident with each other).

Each sealing port may comprise a sealing neck configured for receiving thereover a respective lip of the sealing member at its closed position.

A central portion of each sealing member may have a cross-sectional area at least as large as the cross-sectional area of its respective sealing port.

The control valve may further comprise a cover covering each of the sealing members, the cover being provided with at least one control signal receiving channel.

Each sealing member may be fitted with a biasing element configured to bias it into its closed position.

Each of the biasing elements may be configured to bear, at one end thereof, against an outer face of its respective sealing member, and at an opposite end thereof against the respective cover. The control valve may further comprise a rigid disk disposed between each biasing element and its respective sealing member, the rigid disk supporting a central portion of the sealing member when the sealing member is in its closed position.

The control valve may be designed such that the force required for displacing each sealing member into its closed position is at least equal to the force applied, during use, on an inlet-facing surface thereof by the fluid received therethrough.

Each of the sealing members may be retained by a groove portion formed in the valve body and a complementary groove portion formed in the respective cover.

According to another aspect of the presently disclosed subject matter, there is provided a control valve body comprising:
  an inlet port connectable to an upstream fluid supply line and extending along an inlet axis;
  first and second outlet ports extending, respectively, along first and second outlet axes, and each connectable to a downstream fluid line, the first and second outlet axes extending substantially parallel to a single reference axis and substantially perpendicular to the inlet axis; and
  a first sealing port associated with the first outlet port and disposed in a fluid path between the inlet port and the first outlet port, and a second sealing port disposed in a fluid path between the inlet port and the second outlet port;
wherein each of the sealing ports extends along a sealing axis extending transverse to a plane being parallel to its respective outlet axis and the inlet axis, and forms, between a downstream end thereof and an upstream end of the inlet axis, an obtuse angle greater than 90°.

According to a further aspect of the presently disclosed subject matter there is provided a control valve comprising a valve body having an inlet port connectable to a fluid supply line, a first outlet port, and a second outlet port, independent from the first outlet port, each connectable to a respective downstream line. The valve body is further configured with a distribution chamber extending intermediate the inlet port, the first outlet port and the second outlet port. There is further provided a first sealing port and a second sealing port, each respectively being in flow communication with the first outlet port and the second outlet port and the inlet port. The control valve further comprises a first sealing member and a second sealing member each independently displaceable within the valve body respective the first sealing port and the second sealing port, each of the first sealing member and the second sealing member being configured for independently controlling said respective first sealing port and said second sealing port. In accordance with the disclosed subject matter at least one of the first sealing port and the second sealing port extends over a plane forming an angle differing from 90 degrees with respect to the plane extending normal to a longitudinal axis extending through the inlet port and further wherein an axis extending normal to the each of the at least first sealing port and the second sealing port intersects a plane extending through the inlet and at least one of the first outlet port, and a second outlet port.

In accordance with another aspect of the disclosed subject matter, there is provided a control valve body having an inlet port connectable to a fluid supply line, a first outlet port, and a second outlet port, independent from the first outlet port, each connectable to a respective downstream line; the valve body further configured with a distribution chamber extending intermediate to the inlet port, the first outlet port and the second outlet port, and comprising a first sealing port and a second sealing port, each respectively being in flow communication with the first outlet port and the second outlet port and the inlet port; wherein at least one of the first sealing port and the second sealing port extends over a plane forming an angle differing from 90 degrees with respect to the plane extending perpendicular to a longitudinal axis extending through the inlet port and further wherein an axis extending normal to the at least first sealing port and the second sealing port intersects a plane extending through the inlet and at least one of the first outlet port, and a second outlet port.

Any one of the following embodiments can form part of the above aspects of the disclosed subject matter, alone or in any combination:
  the angle is different from 90 degrees extending above the plane extending perpendicular to the longitudinal axis;
  the angle is about 70 degrees extending above the plane extending perpendicular to the longitudinal axis;
  the first outlet port and the second outlet port are co-planar with the inlet port;
  the first outlet port and the second outlet port are coaxially disposed;
  the first outlet port and the second outlet port are not coaxially disposed;
  the first outlet port and the second outlet port are disposed on a plane extending normal to the longitudinal axis;
  the first outlet port and the second outlet port are co-planar and not coaxially disposed, (disposed over axis offset from each other);
  the first outlet port and the second outlet port extend in parallel with each other;
  at least one of the first sealing member and the second sealing member is a diaphragm;
  at least one of the first sealing member and the second sealing member is a piston actuatable disk;
  each one of the two sealing ports is independently controlled;
  at least one of the first sealing port and the second sealing port can be opened/closed at intermediate positions;
  the first outlet port and the second outlet port extend in parallel with each other;
  the at least two outlet ports extend coaxially with each other;
  the at least two outlet ports extend coaxially with each other and perpendicular to the longitudinal axis;
  the sealing members are configured for normally closing the sealing ports and can be actuated into their open/closed configuration by control signal selected from one of a mechanical signal, hydraulic signal and a pneumatic signal;
  each sealing port is provided with a sealing neck configured for receiving thereover a respective lip of the sealing member at its normally closed configuration;
  a central portion the sealing member having a cross-section area equal or greater than the cross-section area of the sealing port;
  the housing further comprises a cover covering each of the sealing members, the cover being provided with at least one control signal receiving channel;
  the sealing member is fitted with a biasing spring configured to bias the sealing member into its normally closed position;
  the biasing spring bears at one end against the outer face of the sealing member and at an opposed end against the respective housing cover;
  disposed between the biasing spring and the sealing member there is provided a rigid disk, the rigid disk supporting the central portion of the sealing member when the sealing member is in its normal configuration;
  the forces applied on the sealing member for displacing the sealing member into the second, sealing position, is at least equal to the force applied on a bottom face of the sealing member facing the inlet chamber by the fluid received therethrough; and
  the sealing member is retained by a groove portion provided at the valve body and the complementary groove portion at the respective cover.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 1b is a front view of the valve illustrated in FIG. 1a;

FIG. 1c is a top view of the valve illustrated in FIG. 1a;

FIG. 3b illustrates a section just above the valve body;

FIGS. 5a and 5b are cross-sectional views of the valve body of the valve of FIG. 3b, the section of FIG. 5a being the complementing section to FIG. 5b;

FIG. 8a is a perspective view and FIG. 8b is a cross section taken along lines A-A in FIG. 8A; and FIGS. 9a to 9d schematically illustrate a top view of the control valve of the disclosed subject matter in various configurations in accordance with the disclosed subject matter.

DETAILED DESCRIPTION OF EMBODIMENTS

Figure 1A:
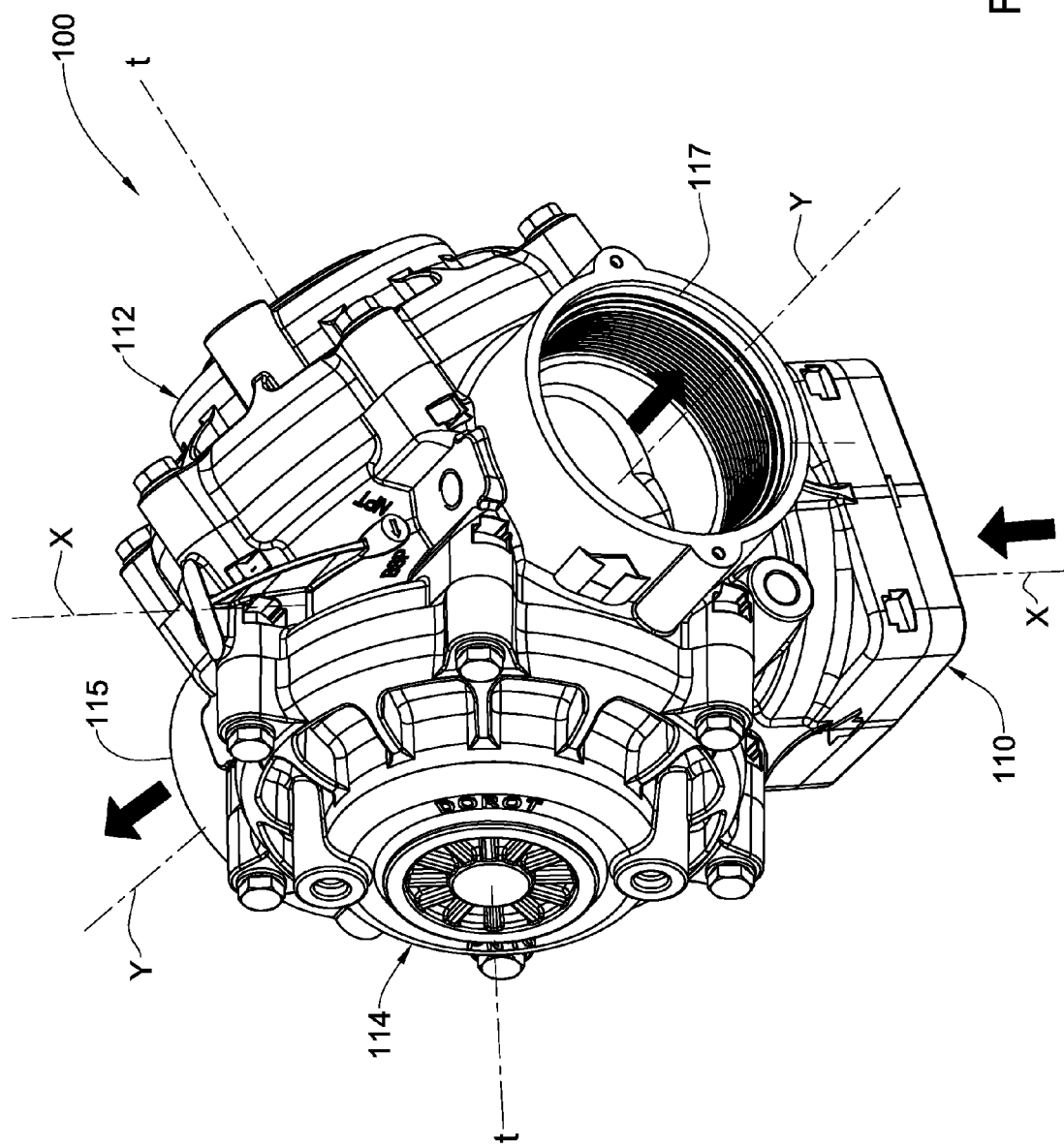
FIG. 1a is a front perspective view of a control valve in accordance with the disclosed subject matter.
Figure 1B:
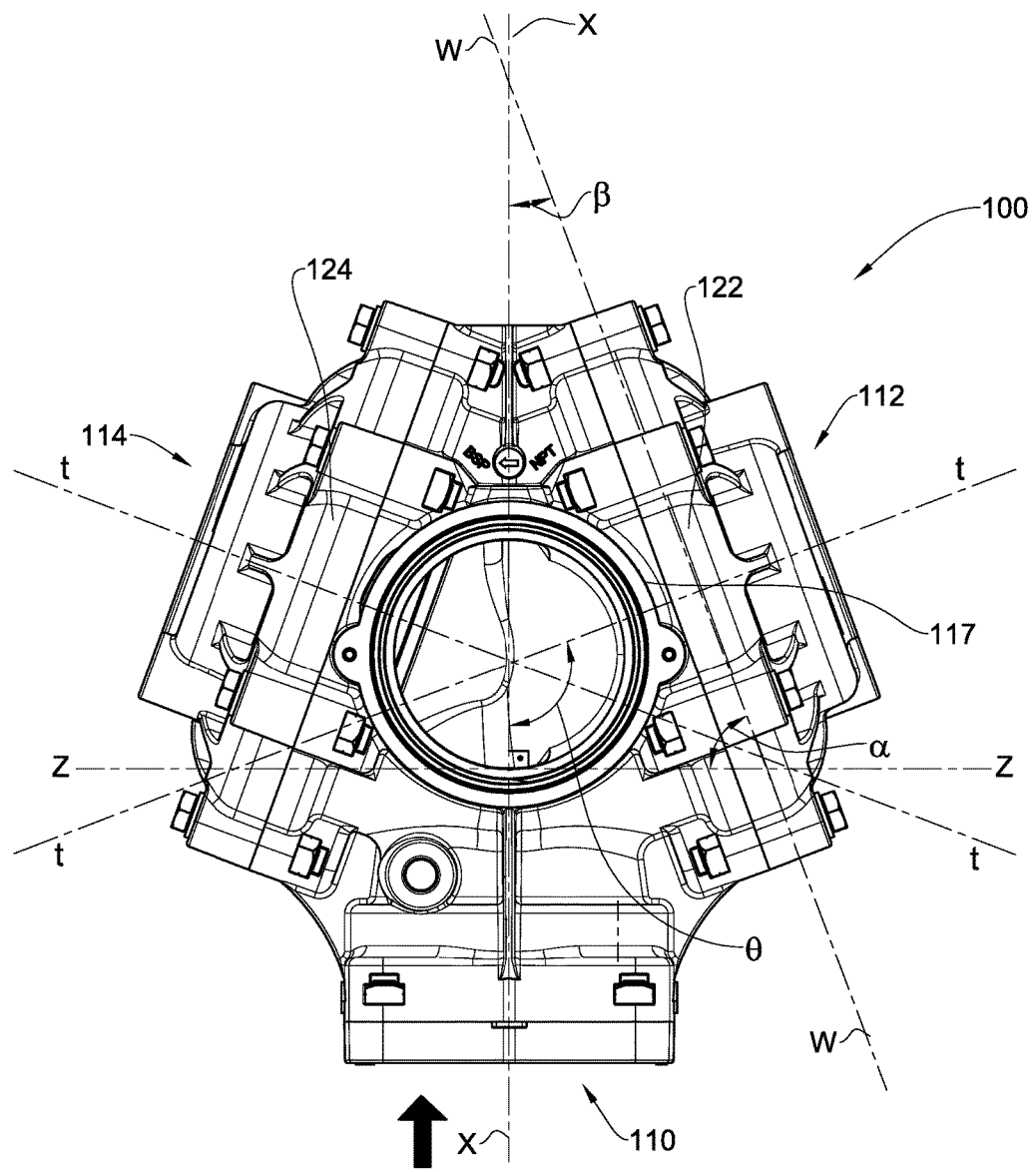
Figure 1C:
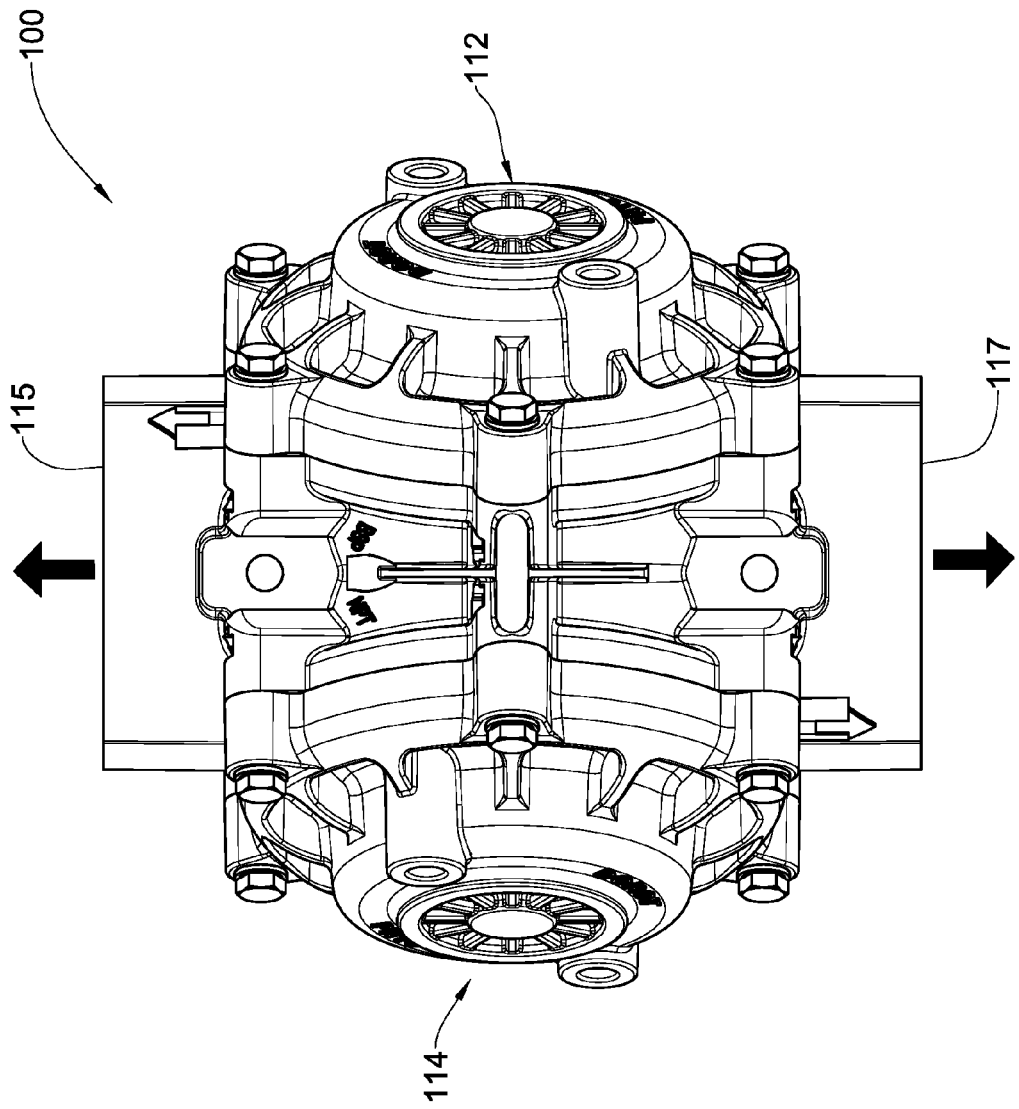
Figure 2:
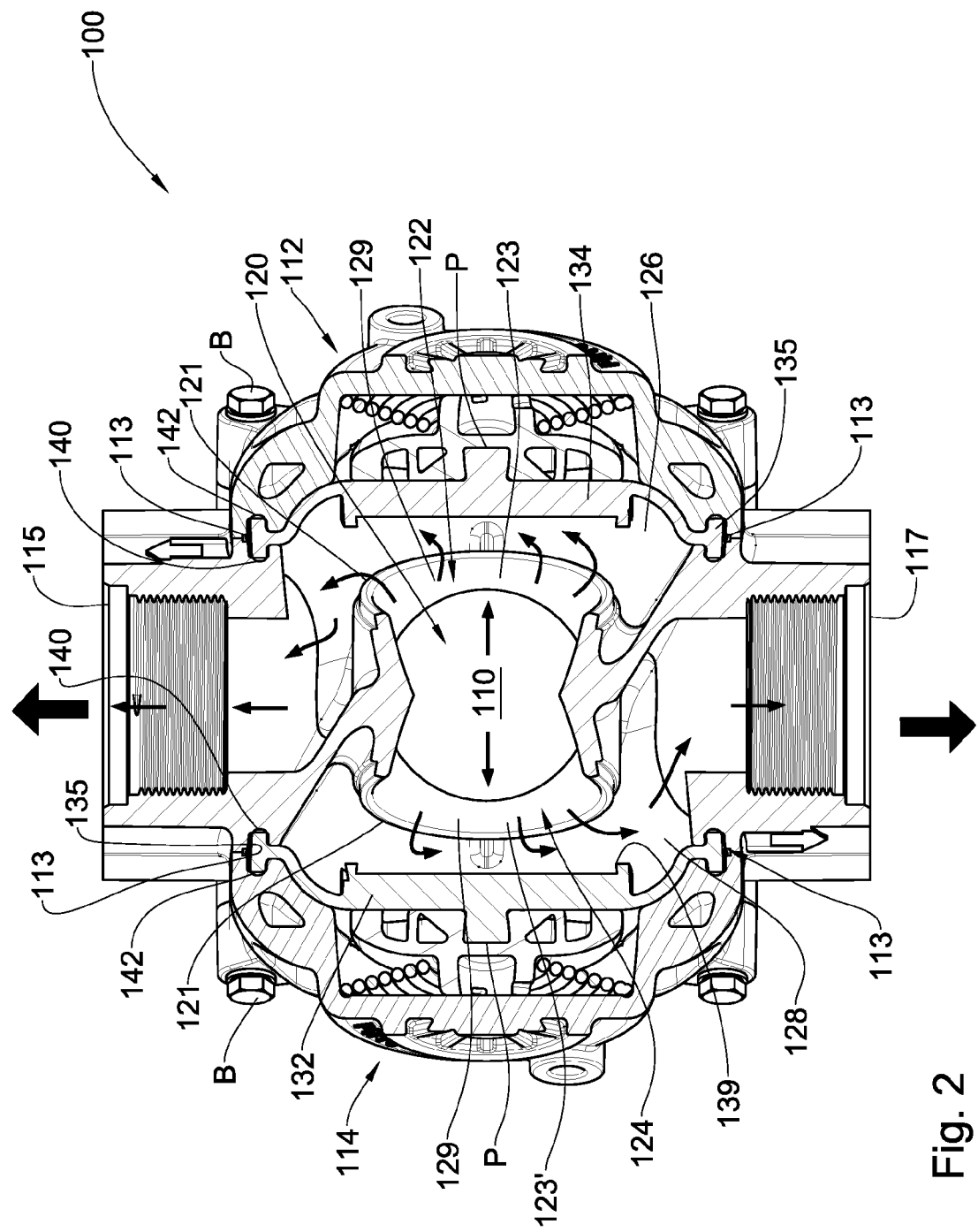
FIG. 2 is a cross-sectional view of the valve of FIG. 1a in an operative position with both of its diaphragms in their open configurations.

As illustrated in FIGS. 1a to 2, there is provided a control valve according to the disclosed subject matter, generally designated 100. The control valve 100 comprises a housing having an inlet port 110 (best seen in FIG. 5a) for connecting to a fluid supply line (not illustrated) and extending along an inlet axis X, and first and second outlet ports 115 and 117, each configured for connecting to a respective downstream fluid line (not illustrated) and extending along a respective outlet axis Y. The outlet axes Y may be substantially coaxial with one another or substantially parallel to one another. The control valve 100 further comprises a distribution chamber 120 (best seen in FIG. 2) disposed in a fluid path between the inlet port 110 and each of the two outlet ports 115 and 117. First and second sealing ports 122 and 124 extend along sealing axes t and are each provided in a fluid path between the distribution chamber 120 and an associated outlet port 115, 117. The fluid paths each follow a respective fluid outlet passageway 126, 128. The sealing ports 122, 124 are each configured such that closing it fluidly isolates the distribution chamber (and thus the inlet port 110) from its respective outlet port, and opening each of the sealing ports facilitates flow communication between the distribution chamber (and thus the inlet port) and its respective outlet port.

The control valve further comprises two sealing members, for example diaphragms 132 and 134, each being axially displaceable within the housing 100 along the sealing axis t. The sealing members may be formed from any suitable material, such as rubber or any other elastomeric material, such as silicon, etc. While in the current example there is disclosed a diaphragm as a sealing member, it will be appreciated that the sealing members may comprise or be constituted by other suitable element, such as a piston operated disk, such as will be disclosed with reference to FIGS. 8a and 8b.

The sealing ports 122 and 124 may each have a circular cross-section, and be formed with a sealing neck 123, 123'. The sealing necks 123, 123' each comprise a sealing seat 121 and an essentially cylindrical wall 129. It will be appreciated that although the sealing neck is described herein as having a circular cross-section, other geometries are possible, such as an oval cross-section, a rectangular cross-section, or any other suitable configuration.

Figure 3A:
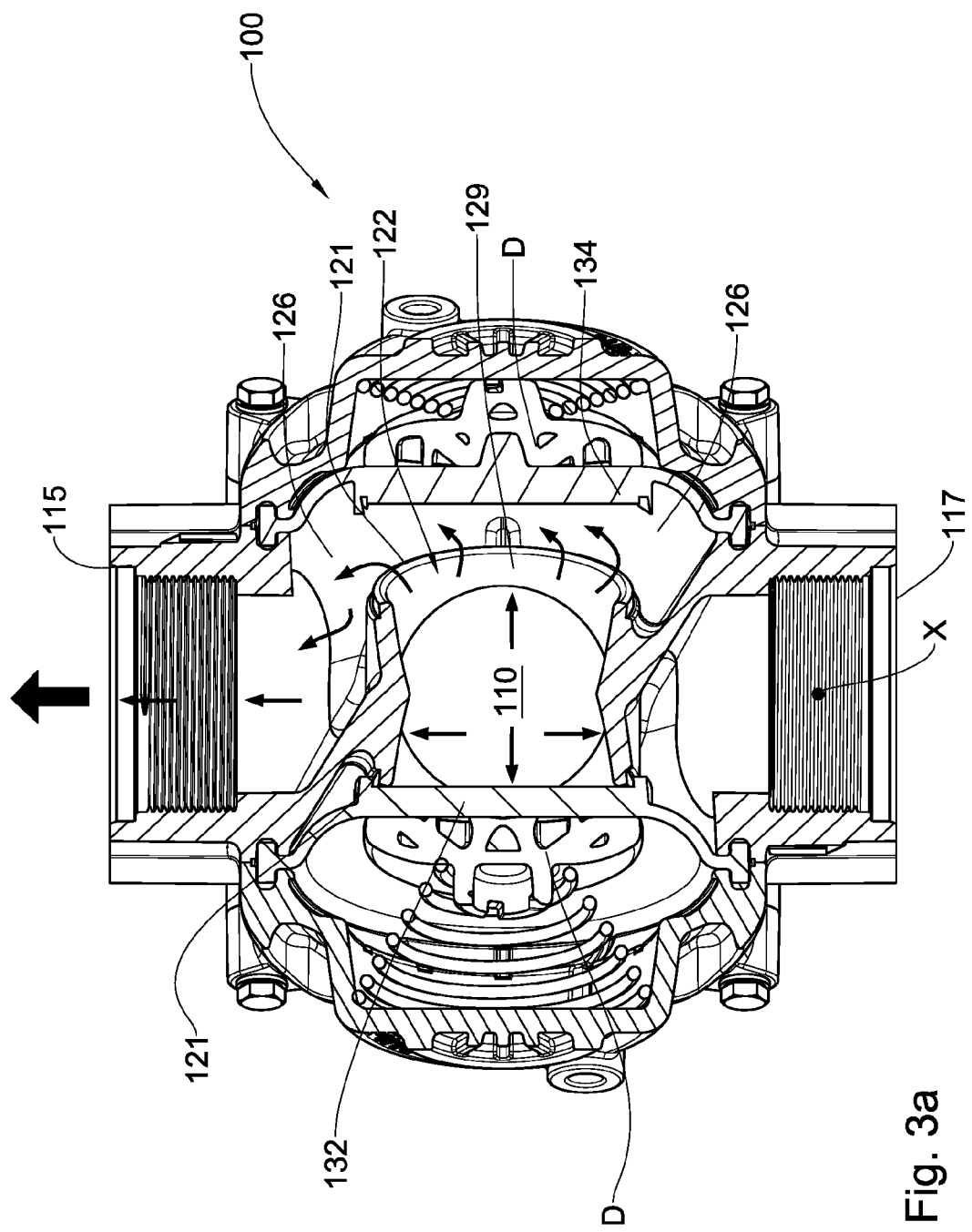
FIGS. 3a and 3b are cross-sectional views taken of the valve of FIG. 1c in an operative position with one of the diaphragms in its open configuration and the other in its resting closed configuration, such that FIG. 3a illustrates a cross section through the valve body

The diaphragm 132, 134 is fixedly clamped at 117 between the walls of distribution chamber 120 of the housing at 113 (seen for example in FIG. 2) and a flanged cover member 112 and 114 secured to the housing by bolts B, further being configured for supporting the diaphragms 132, 134 in one of a first position (e.g., as shown in FIG. 2) and a second position (e.g., as shown in FIG. 3a in connection with diaphragm 132), as will hereinafter be explained. As seen in FIG. 2, edges of the diaphragms may be have a T-shaped cross-section, which is clamped between groove portions 140 formed in the valve body (the groove portion is seen without the diaphragm in FIG. 4) and a corresponding groove 142 formed in the respective cover 112, 114.

Extending between each diaphragm and the respective cover member there is provided a control chamber for controlling the sealing function of the diaphragm. As will be further discussed, each of the diaphragms is independently controlled to close and open the sealing port such that at least four different configurations are possible: (a) both sealing ports are open (seen in FIG. 2); (b, c) one sealing port is open and the other is closed (seen in FIG. 3a); and, (d) both sealing ports are closed by the diaphragm (not shown). It will be appreciated that intermediate positions are possible in this configuration such that the sealing member (in this example the diaphragm) can extend with respect to the sealing port at any distance between open and closed. This allows regulation of the fluid pressure and flow through the ports to the outlets. It will be appreciated that the sealing member can be configured to partially close the sealing port so as to allow a regulated amount of fluid flow through the sealing ports.

The diaphragm has a first side facing the distribution chamber 120 and a second side facing the respective cover 112 and 114. A central portion of each diaphragm is provided with a sealing lip 139 protruding outwardly from its surface, and surrounding an area equal or greater than that that defined by the sealing necks 123 and 123' of the sealing ports 122, 124. The sealing lip 139 is configured to sit over the respective sealing seat of the sealing neck, so as to close the sealing port. This central area is of thickness larger than that of the remaining area of the diaphragm. To control the opening and closing of the diaphragm, it is provided with a biasing spring configured to bias the diaphragm into its normally closed position. The biasing spring bears at one end against the second face of the diaphragm and at an opposed end against the respective housing cover. To provide rigidity and sufficient structural resilience to the diaphragm to withstand the forces exerted thereon and protect it from the wear and tear of the biasing spring, there is provided a rigid disk D.

The rigid disk D (seen e.g. in FIGS. 2 and 3a) is disposed between the biasing spring and the diaphragm by being mounted over a protrusion P extending in this example at the center of the diaphragm 132, 134. It will be appreciated that the biasing spring can be held in place by different mechanical means. The rigid disk is configured for supporting the central portion of the diaphragm in either one of its configurations.

As best seen in FIG. 1b, an inlet axis X extends through the inlet port 110. The plane W-W extending across the sealing port and the diaphragm on each side extends by forming an angle α with respect to the plane Z extending perpendicular to the longitudinal axis X and angle β with respect to the central axis. In accordance with the disclosed subject matter the angle α is smaller than 90°. In accordance with the disclosed subject matter, the angle α is in the range between about 45-85°. In accordance with an example the angle is between about 60-80°. In accordance with the illustrated example, the angle α is about 70°. It will be also appreciated, that in accordance with the disclosed subject matter sealing axis t extending normal to the first sealing port and the second sealing port intersects a plane XY extending through the inlet and the first outlet port and the second outlet port.

It will be further appreciated that sealing axis t associated with each of the sealing ports 122, 124 extends transverse to a plane defined by the inlet axis X and the its respective outlet axis Y (e.g., in FIG. 2*b*, this is the plane when extends perpendicular to the page through axis X), or which is parallel to those two axes, for example in example in which they are not co-planar. The sealing axis t forms an obtuse angle (i.e., one greater than 90° and less than 180°) between the upstream end on the inlet axis (i.e., the lower part of axis X as depicted in FIG. 1*b*) and the downstream end of the sealing axis t, i.e., angle θ is greater than 90° and less than 180°. According to some examples, the angle θ is between about 95° and about 135°. According to other examples, the angle θ is between about 100° and about 120°. According to another example, the angle θ is about 110°, as illustrated in FIG. 1*b*.

Referring now to FIG. 2, the distribution chamber is in the so-called double open position in which the sealing ports are not sealed by the diaphragms and fluid flows from the inlet port 110, via both sealing ports 122 and 124, through the fluid passageways 126 and 128 and out through the respective outlet ports 115 and 117. In this illustration, the fluid flow is marked by the arrows showing the direction of the fluid within the distribution chamber and through the outlet ports.

Figure 3B:
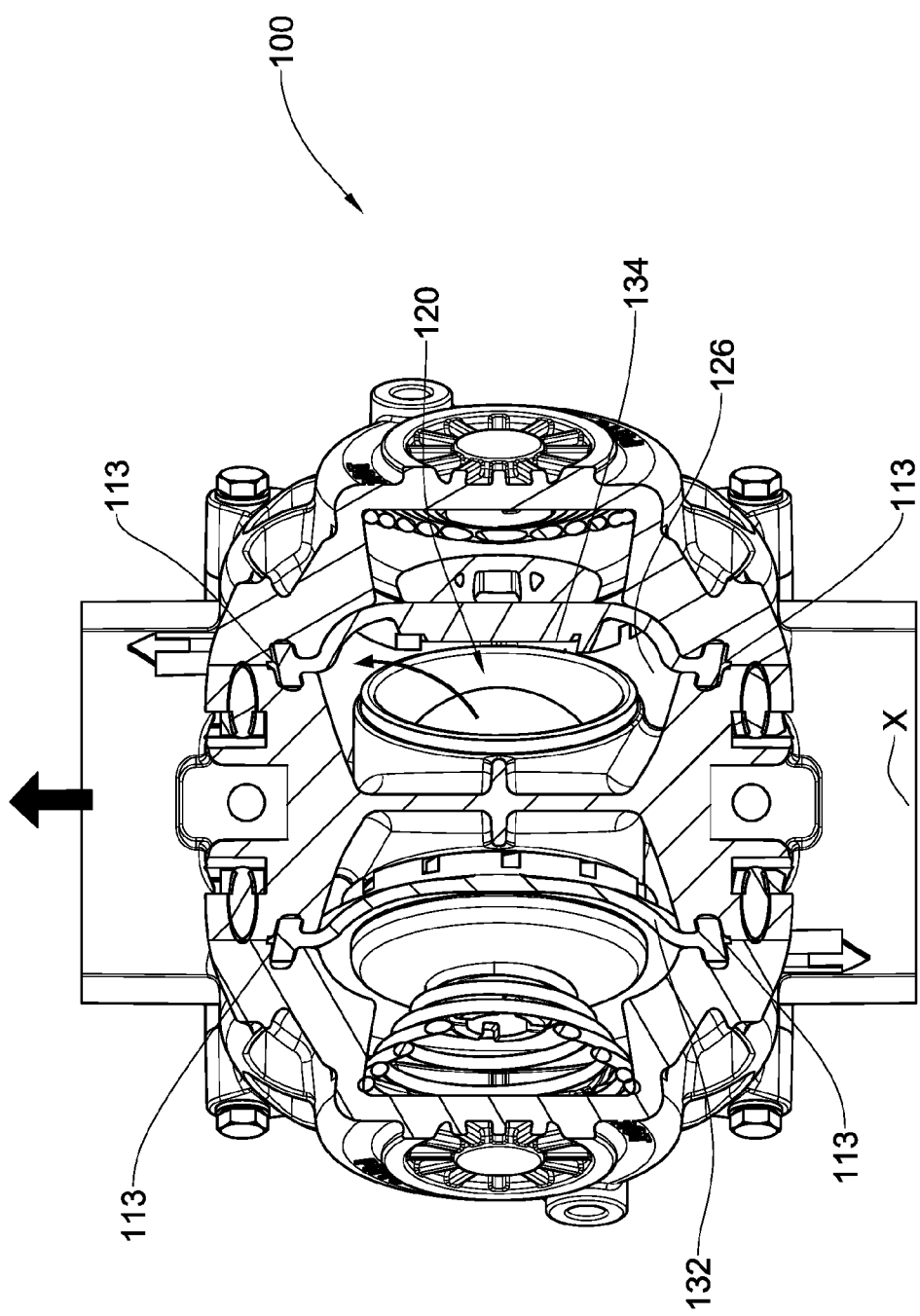

However, when it is required to close any one of the sealing ports against the pressure and forces of the fluid in the inlet, a control signal such as a mechanical signal, hydraulic or a pneumatic control signal is introduced via the respective control chamber by way of actuation of the biasing spring or by introducing hydraulic or pneumatic pressure into the control chamber, thereby applying force on the second side of the diaphragm, which force is equal or greater than the force applied by the fluid on the first (bottom) face of the diaphragm, thus causing the diaphragm to flip with its central portion moving downward to the position of FIG. 3*b*, entailing closing of the sealing port by the central portion of the diaphragm.

As best seen in FIG. 3*a*, the sealing ports can be selectively and independently sealed, and in this example, one control chamber received a control signal to move the respective diaphragm into a sealing position and the other (on the right hand side of the illustration) remained unsealed allowing fluid to exit through the outlet port 115 and preventing fluid flow from outlet 117. The diaphragm is moved into the closing configuration upon increase of pressure in the control chamber above the diaphragm following the control signal received by the control chamber.

Figure 8A:
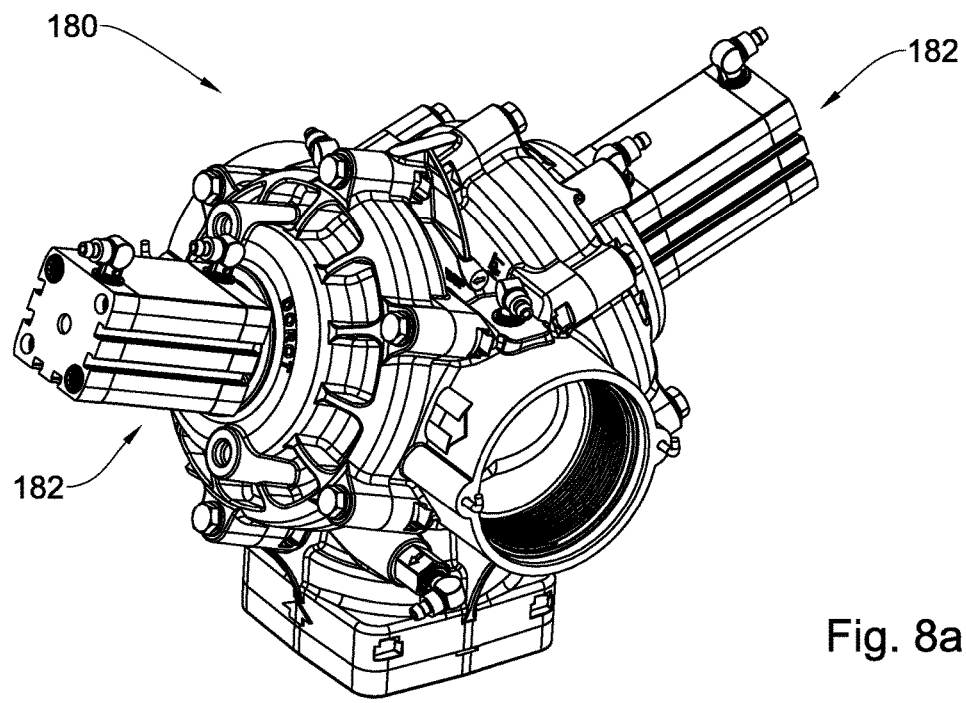
FIGS. 8a and 8b illustrate a control valve in accordance with another example of the disclosed subject matter, where
Figure 8B:
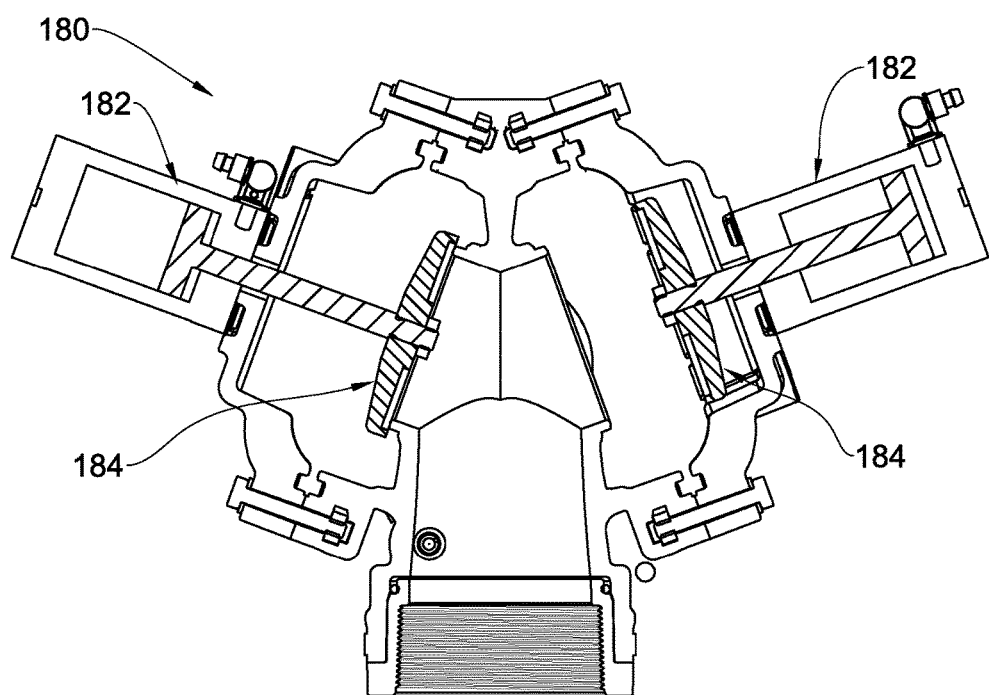

With respect to the configuration of FIGS. 8*a* and 8*b* the sealing member 182 and 184 are activated by the piston. In accordance with an alternative example (not shown) the sealing member can be associated with a biasing member such as a spring, which being similar to the configuration of the diaphragms, is biased to keep the disk in the position closing the ports. Upon receiving of a control signal or raise in fluid pressure in the inlet, the disk will be disassociated from the sealing seat of the sealing port and the fluid can flow therethrough and out through the respective outlet port 115, 117. In the event that only one of the fluid passageways necessitates operation, a control signal will be provided through the piston and the disk 182, 184 will remain sealing the sealing port despite the built up pressure in the inlet.

Figure 4:
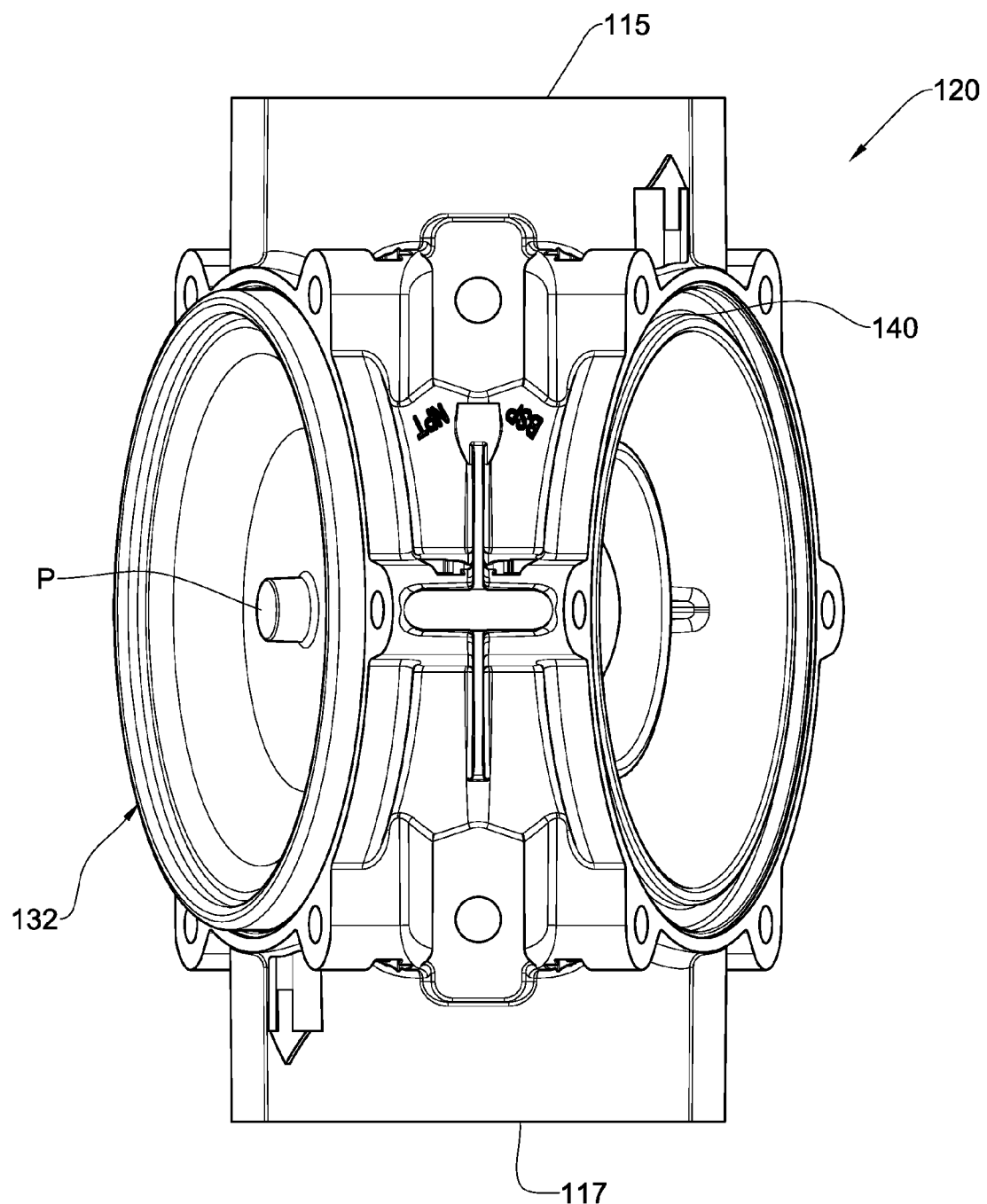
FIG. 4 illustrates a top view of the valve body with one of the diaphragms shown in its closed configuration.
Figure 6:
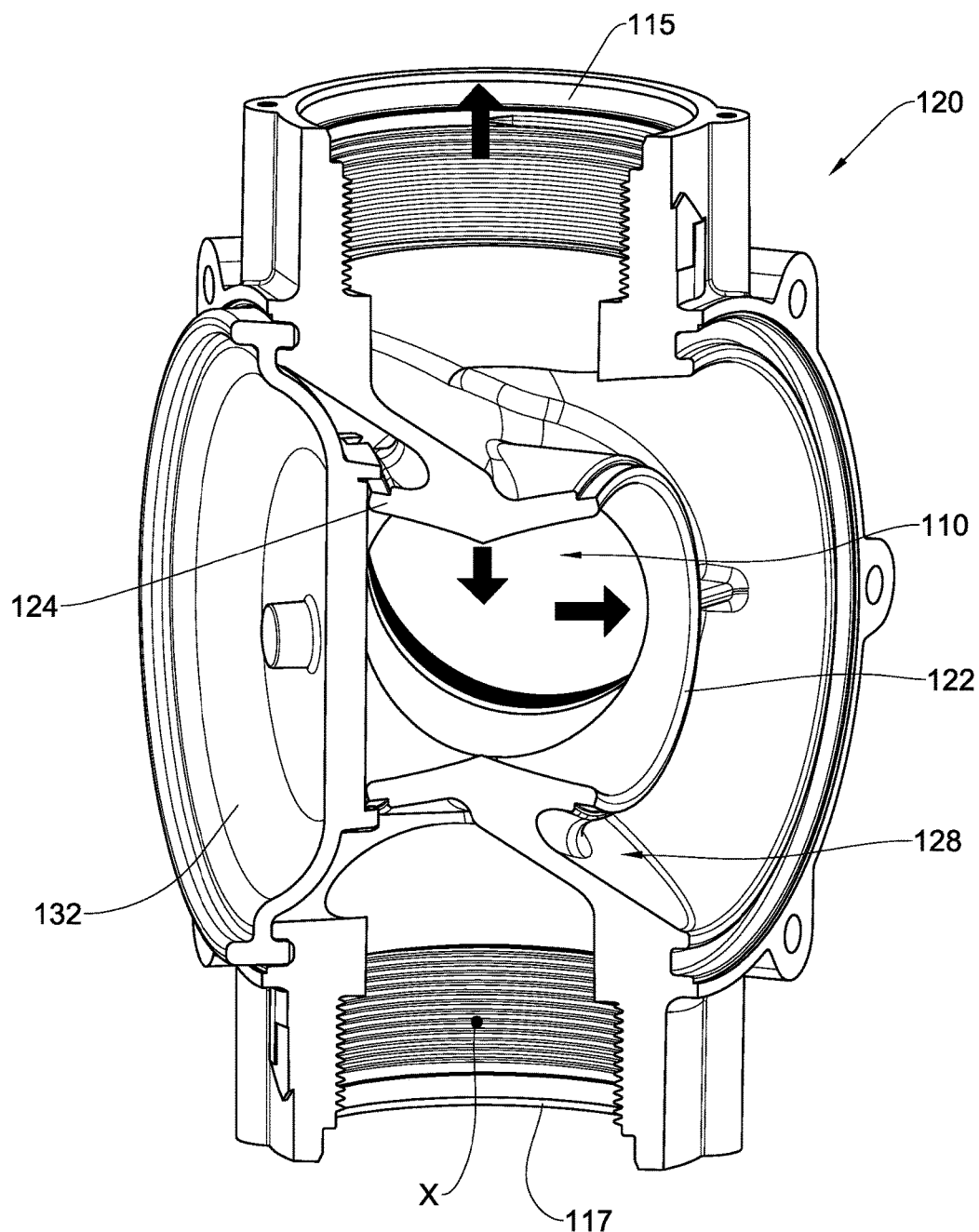
FIG. 6 is a cross-sectional view of the valve body of FIG. 4, with one of the diaphragms shown in its closed configuration.
Figure 7A:
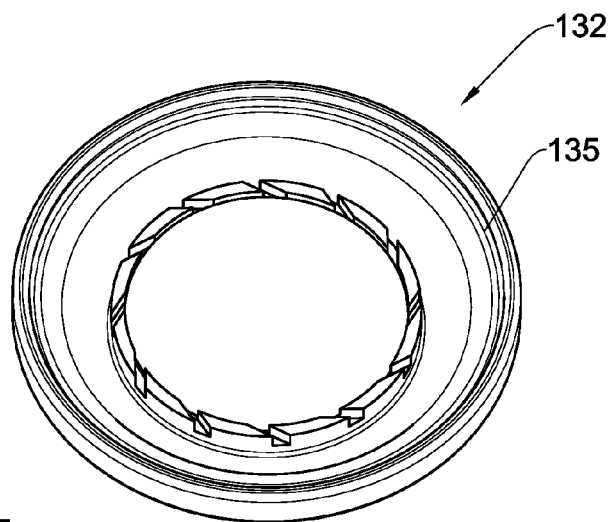
FIGS. 7a to 7c illustrate the diaphragm of the disclosed subject matter in various operational positions.
Figure 7B:
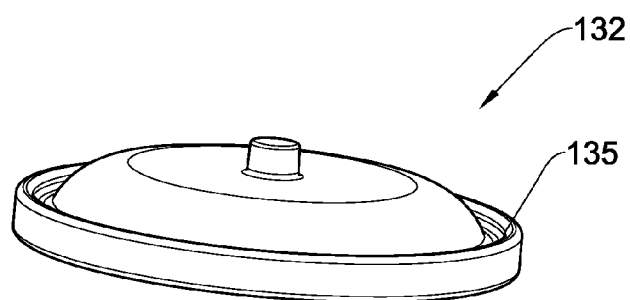
Figure 7C:
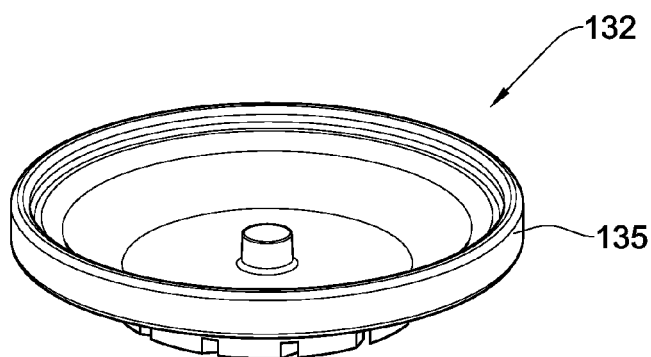

Furthermore, upon decrease of pressure in the inlet line below a predetermined threshold, the valve will spontaneously close owing to the initial force applied by the biasing spring. FIGS. 4 to 6 illustrate the distribution chamber 120 with only one diaphragm 132 sealing the sealing port 124 with the sealing port 122 devoid of any diaphragm. The groove 140 for holding a portion of the diaphragms lip is seen in FIG. 4.

FIGS. 5*a*, 5*b* and 6 illustrate the distribution chamber in cross sections and it is seen how sealing of one of the ports directs the fluid through one of the fluid passageways 128 and out of one of the fluid outlets 115. This is further facilitated by the vertically extending wall structure enclosing, along with the sealing diaphragm, the inlet, thus allowing the fluid to exit through the outlet. It will be appreciated that each of the sealing ports is independently controlled and thus the outlet ports are also independently active. Thus, in accordance with the disclosed subject matter, either one or both of the outlet ports can be functional, namely allowing fluid to flow therethrough or both can be non-active in case both of the sealing members (diaphragms) receive a control signal and are activated into a sealing mode.

Attention is now directed to FIGS. 8*a* and 8*b*, which illustrate a control valve generally designated 180 similar in its structure to the valve 100 with the difference residing in that the sealing members are in the form of a piston 182 actuatable disk 184. The disk is configured to geometrically fit over the sealing seat of the sealing neck thereby allowing closing of the port. It will be appreciated that the function of the control valve is similar to that of valve 100, mutatis mutandis.

As schematically illustrated in FIGS. 9*a* to 9*d*, the control valve 100 may be provided such that the outlet ports 115, 117 and sealing ports 122, 124 are aligned differently than illustrated in FIGS. 1*a* through 8*b*. In FIG. 9*a*, the control valve 100 is schematically illustrated, for reference, with the outlet ports 115, 117 and sealing ports 122, 124 aligned as in FIGS. 1*a* through 8*b*, i.e., the outlet axes Y of the outlet ports 115, 117 are substantially coaxial with one another, and the sealing axes t traverse a plane, which is parallel to the inlet axis X and to the outlet axes Y, perpendicularly.

FIG. 9*b* schematically illustrates a configuration in which the outlet axes Y are not coaxial with one another, and the sealing axes t lie in a single plane and traverse a plane, which is parallel to the inlet axis X and to the outlet axes Y, perpendicularly.

FIG. 9*c* schematically illustrates a configuration in which the outlet axes Y are not coaxial with one another, and the sealing axes t lie in parallel planes and traverse a plane, which is parallel to the inlet axis X and to the outlet axes Y, at a non-perpendicular angle.

FIG. 9*d* schematically illustrates a configuration in which the outlet axes Y are not coaxial with one another, and the sealing axes t lie in a single plane and traverse a plane, which is parallel to the inlet axis X and to the outlet axes Y, at a non-perpendicular angle.

It will be appreciated that the configurations illustrated schematically in and described with reference to FIGS. 9*a* through 9*d* are non-limiting examples of configurations according to the presently disclosed subject matter.

Those skilled in the art to which this invention pertains will readily appreciate that numerous changes, variations, and modifications can be made without departing from the scope of the presently disclosed subject matter, mutatis mutandis.

The invention claimed is:

1. A control valve comprising:
   a valve body having an inlet port connectable to an upstream fluid supply line and extending along an inlet axis;
   first and second outlet ports extending, respectively, along first and second outlet axes, and each connectable to a downstream fluid line, said first and second outlet axes extending substantially parallel to a sing reference axis and substantially perpendicular to said inlet axis;
   a first sealing port associated with said first outlet port and disposed in a fluid path between the inlet port and the first outlet port, and a second sealing port disposed in a fluid path between the inlet port and the second outlet port; and
   first and second sealing members configured for independently and selectively opening and closing the first and second sealing ports, respectively;
   wherein each of said sealing ports extends along a sealing axis extending transverse to a plane being parallel to its respective outlet and said inlet axis, and forms, between a downstream end thereof and an upstream end of the inlet axis, an obtuse angel greater than 90°.

2. The control valve according to claim 1, wherein the angle between each sealing axis and the inlet axis is about 110°.

3. The control valve of claim 1, wherein at least one of the first sealing member and the second sealing member comprises a diaphragm.

4. The control valve according to claim 1, wherein at least one of the first sealing member and the second sealing member comprises a piston actuatable disk.

5. The control valve according to claim 1, wherein each of said sealing members is configured to move between open and closed positions along its respective sealing axis.

6. The control valve according to claim 1, wherein at least one of the first sealing port and the second sealing port is configured so as to be opened to at least one intermediate position between fully opened and closed.

7. The control valve according to claim 1, wherein the first and second outlet axes are co-planar with the inlet axis.

8. The control valve according to claim 1, wherein the first and second outlet axes are coaxially disposed.

9. The control valve according to claim 1, wherein each sealing port comprises a sealing neck configured for receiving thereover a respective lip of the sealing member at its closed position.

10. The control valve according to claim 1, wherein a central portion of each sealing member has a cross-sectional area at least as large as the cross-sectional area of its respective sealing port.

11. The control valve according to claim 1, further comprising a cover covering each of the sealing members, the cover being provided with at least one control signal receiving channel.

12. The control valve according to claim 1, wherein each sealing member is fitted with a biasing element configured to bias it into its closed position.

13. The control valve according to claim 12, wherein each biasing element is configured to bear, at one end thereof, against an outer face of its respective sealing member, and at an opposite end thereof against a respective cover.

14. The control valve according to claim 13, further comprising a rigid disk disposed between each biasing element and its respective sealing member, the rigid disk supporting a central portion of the sealing member when the sealing member is in its closed position.

15. The control valve according to claim 1, wherein the force required for displacing each sealing member into its closed position is at least equal to the force applied on an inlet-facing surface thereof by the fluid received therethrough.

16. The control valve according to claim 1, wherein each sealing member is retained by a groove portion formed in the valve body and a complementary groove portion formed in a respective cover.

* * * * *